June 23, 1970     R. B. HOWELL     3,516,409
SLIDE FASTENER EMPLOYING SKIN CLOSURE APPLIANCES AND TECHNIQUES
Filed Feb. 28, 1968     5 Sheets-Sheet 1

INVENTOR.
ROBERT B. HOWELL
BY
ATTORNEYS

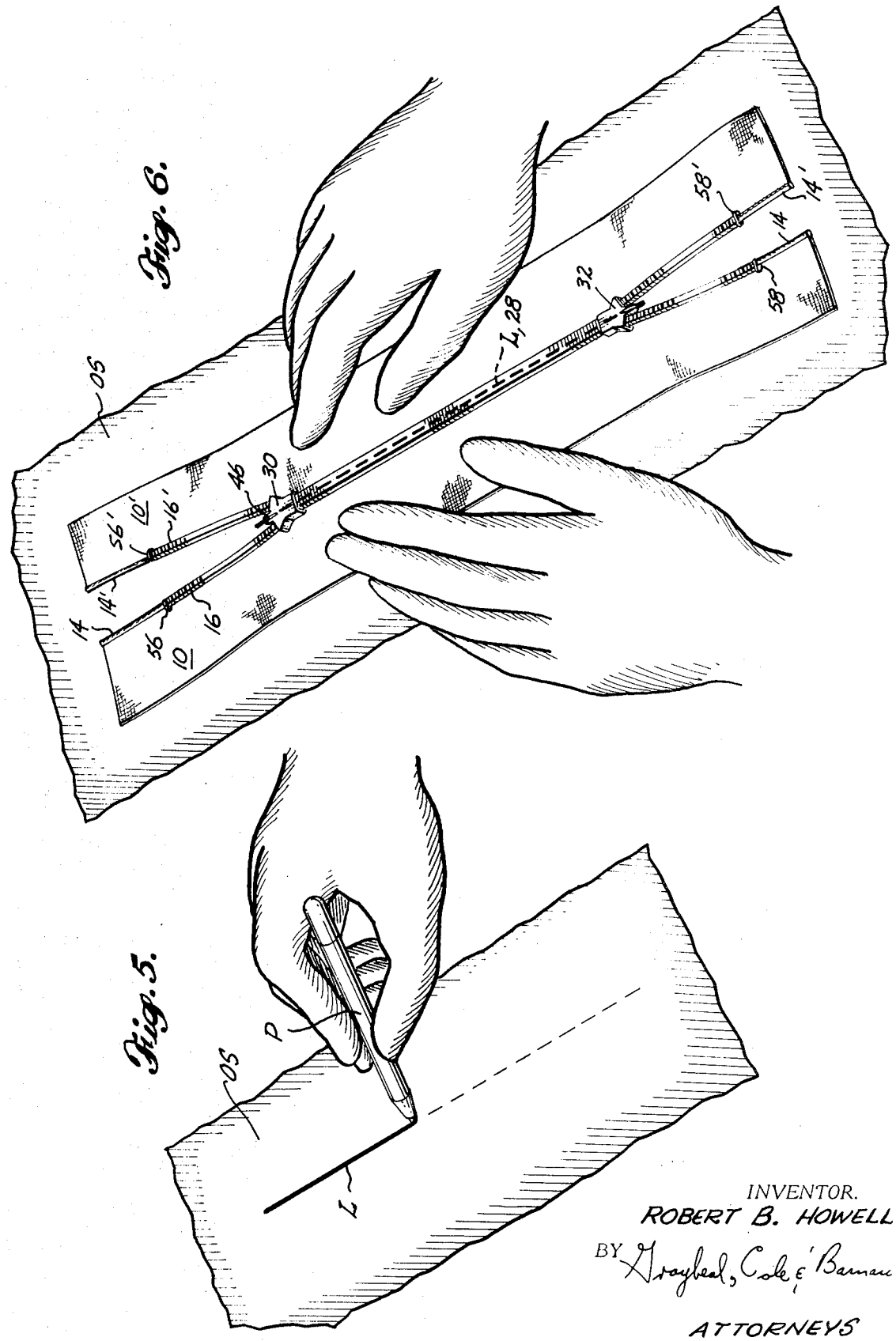

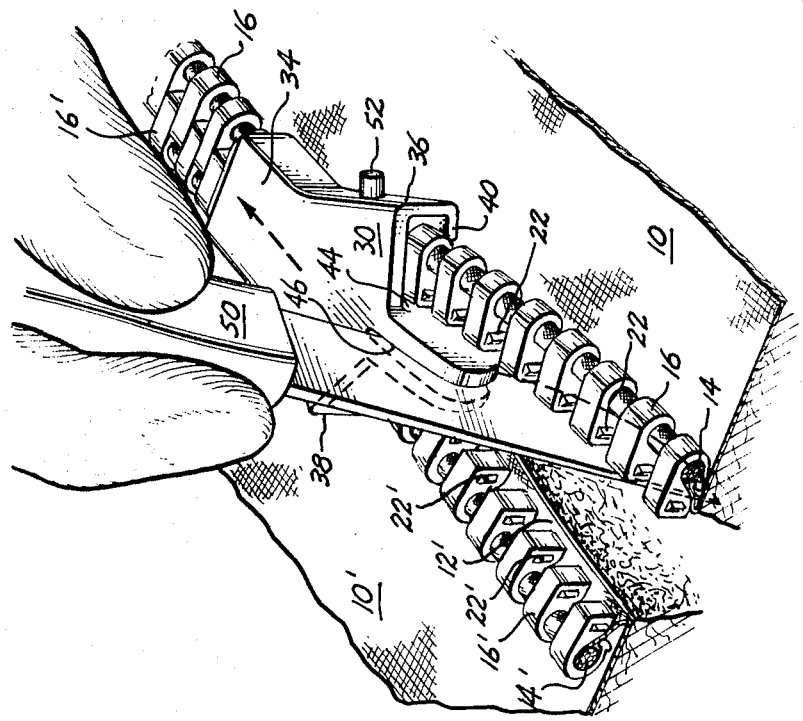
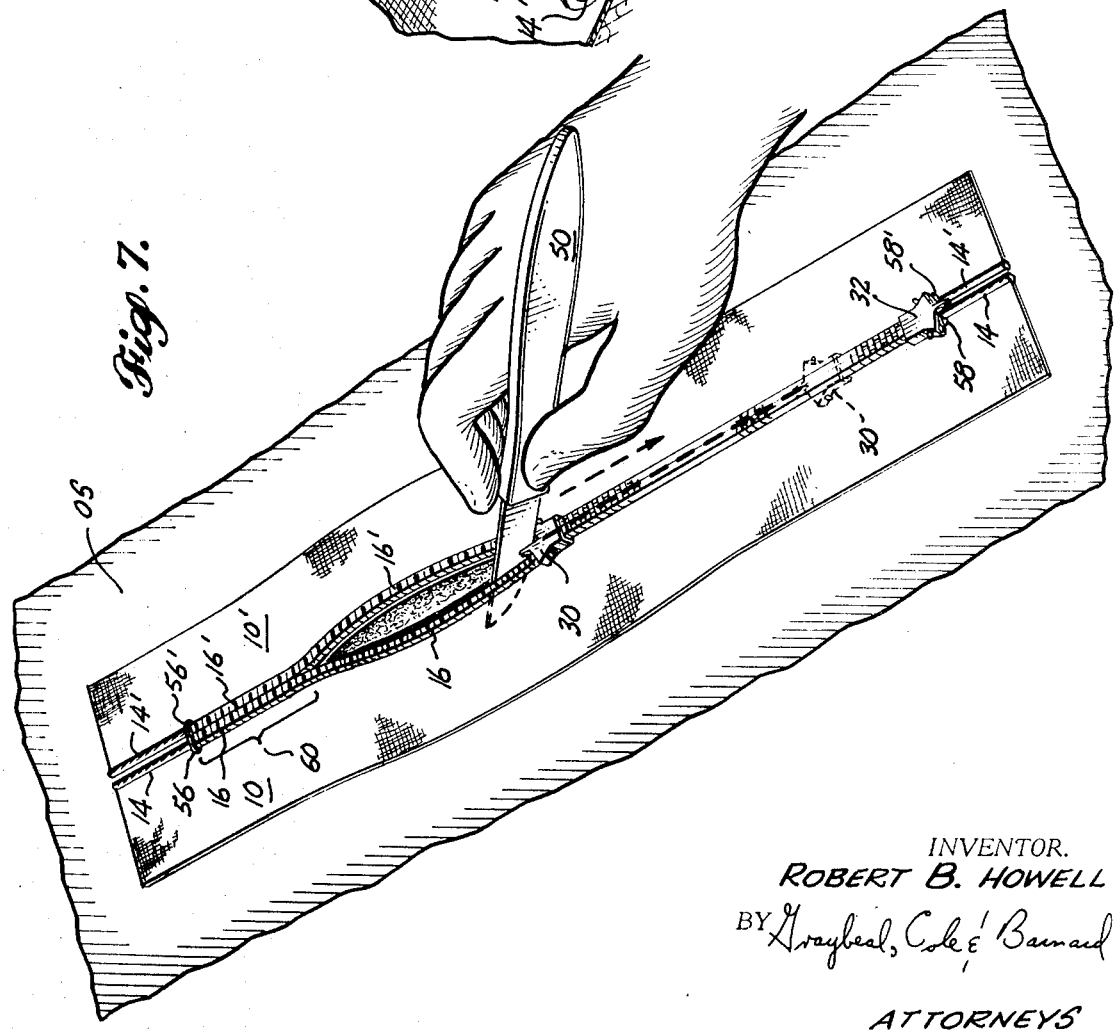

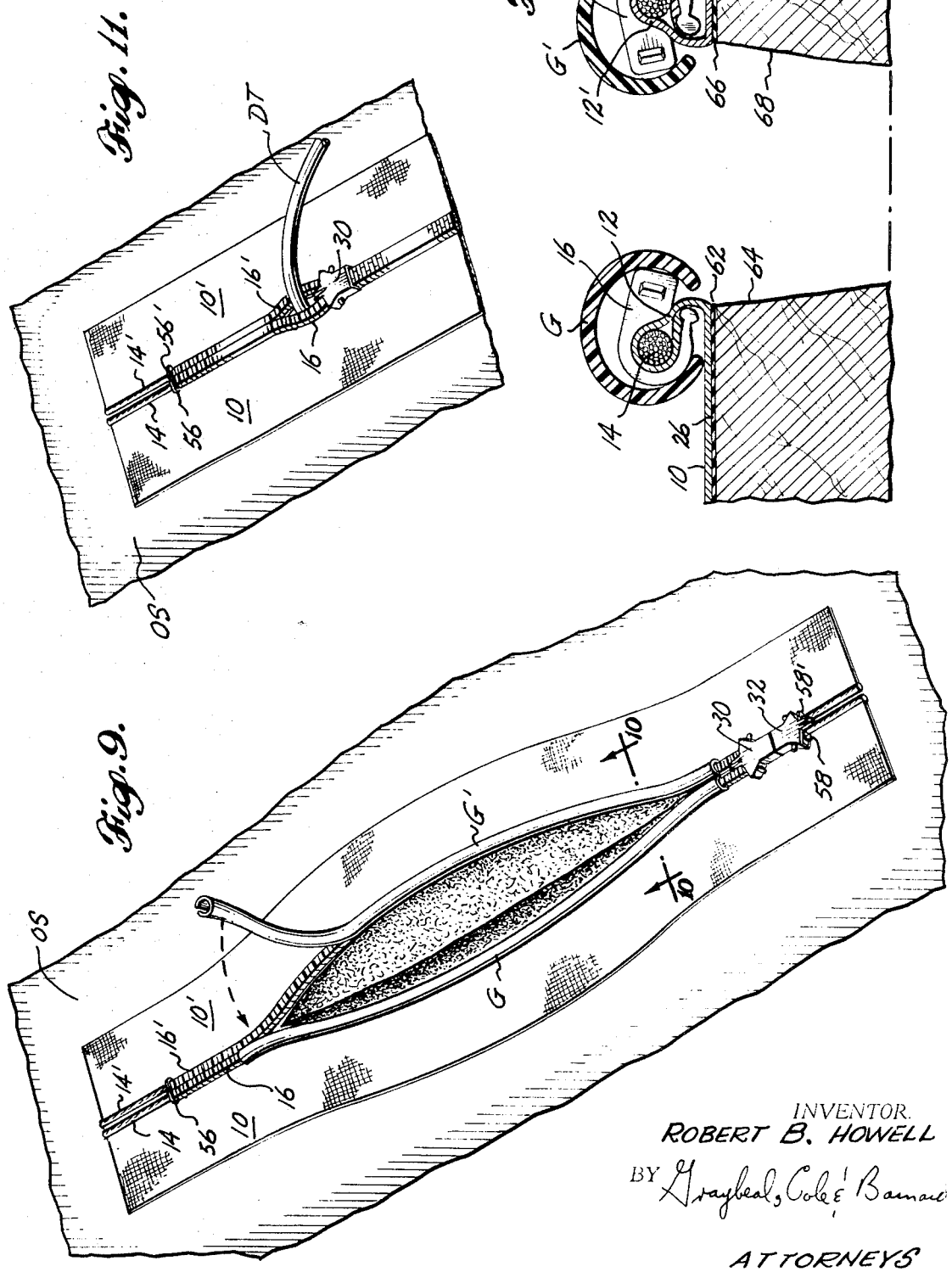

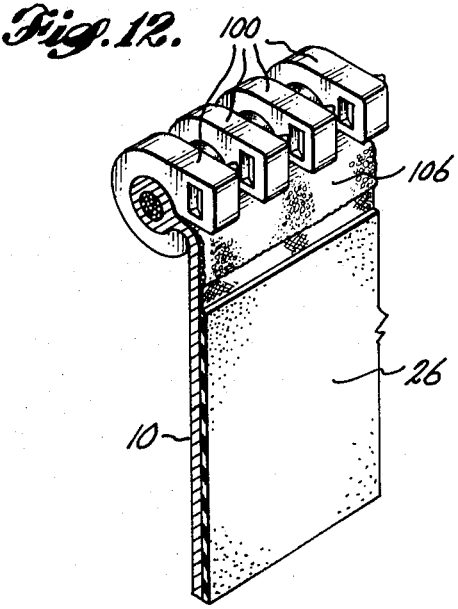
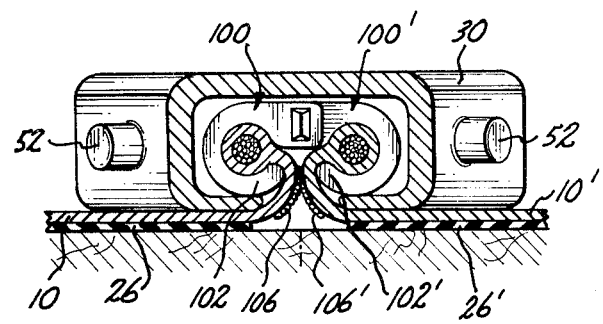
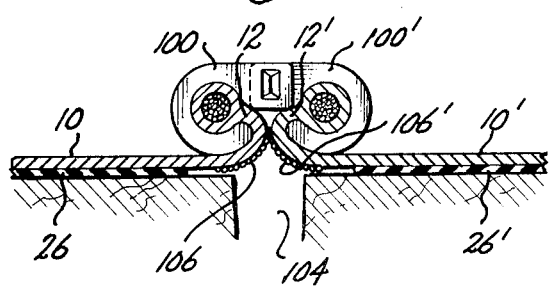
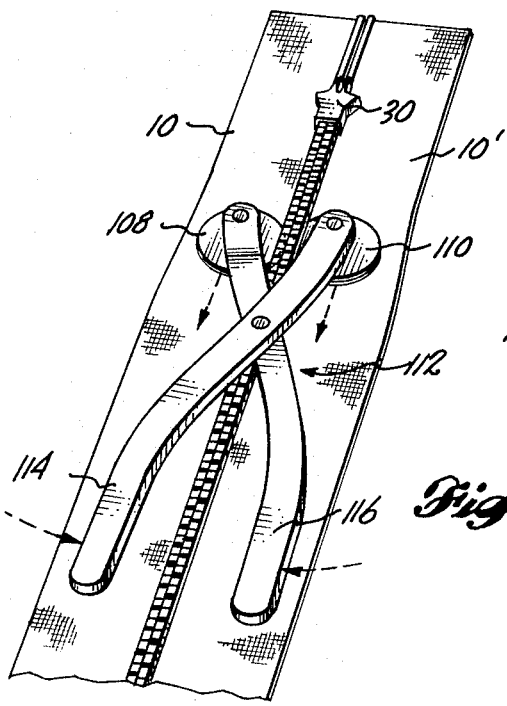
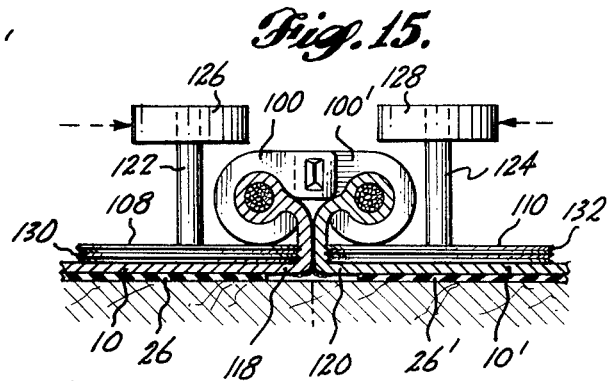

United States Patent Office 3,516,409
Patented June 23, 1970

3,516,409
SLIDE FASTENER EMPLOYING SKIN CLOSURE APPLIANCES AND TECHNIQUES
Robert B. Howell, 2115 Madrona Point Drive, Bremerton, Wash. 98310
Continuation-in-part of application Ser. No. 478,675, Aug. 10, 1965. This application Feb. 28, 1968, Ser. No. 712,329
Int. Cl. A61b 17/04
U.S. Cl. 128—335                         27 Claims

ABSTRACT OF THE DISCLOSURE

A seam type slide fastener having adhesive on the seam side thereof. A slider situated entirely forwardly of the adhesive backing and including a slot for receiving a scalpel blade. Moving the slider by a scalpel inserted in the slot to both make an incision and open the slide fastener. Closing the incision by reverse movement of the slider to bring the skin back to substantially its original position.

CROSS-REFERENCES TO RELATED APPLICATION

This is a continuation-in-part of my copending application No. 478,625, filed Aug. 10, 1965, and entitled Sutureless Skin Closure Appliances and Techniques, now abandoned.

BACKGROUND OF THE INVENTION

Field of the invention

The present invention relates to appliances for, and certain techniques of, making substantially exact approximations and sutureless closures of surgical incisions and traumatic wounds. The appliance includes a slide fastener and is adapted to return the epidermis to substantially the exact position it occupied before being severed.

Description of the prior art

Incision and wound closure without sutures has been a goal of man's endeavor for some time. Several alternatives to sutured closures have been proposed, but as yet none have superseded the sutured closure. Sutured closures remain the principal manner of closing all forms of cuts despite the clinical complications and cosmetic problems associated with them. The clinical compositions associated with sutured closures include suture abscess, skin necrosis due to tension, cross-patch scarring and, in some situations, discomfort. More important than all these, however, is the possible association between suture infections and deep and wound sepsis. Every puncture of the skin can add a significant hazard of infection, either local to the suture or generalized. Even the most delicately placed suture may tighten during the period of post-operative edema with a resultant necrosis. Since the suture process itself cuts across skin appendages along the entire course of the suture, it complicates healing of the wound. The tissue that has been damaged by the sutures will take longer for repair. Furthermore, the suture only brings the epidermis together in approximately the position which it occupied before the incision was made or the wound inflicted. The suture brings the epidermis together unevenly, with positive closure only being made at the stitch points. Between the stitch points there is a tendency for the epidermis to pucker and resist complete closure because of the uneven tension on it, inherent with the stitching principle. The suture (thread or gut) must be of sufficient diameter to avoid tearing the tissue. Each of these factors contribute to the creation of a visible scar. Scar tissue is formed at the incision or wound in the areas where the severed edges of the epidermis are not held exactly together, and some scar tissue is formed at each location where the suture passed through the epidermis.

Thousands of years before the Christian Era, Egyptians approximated wounds by using strips of linen coated with barley cream, honey, or similar glutenous substances. This technique was used with variations throughout the centuries which followed. The use of tape closures were strongly advocated in this country in the early part of the Nineteenth Century. However, it has only been in recent years that a surgical tape possessing the necessary qualities has been available. Examples of such tapes are "Micropore Surgical Tape" and "Steri-Strip Skin Closures," products of the 3M Company of St. Paul, Minn., it is generally accepted that, for most wounds at least, closures made with tape of this type are superior to sutured closures. A disadvantage of the tape closure is that the approximation of the wound edges is a time consuming procedure and is dependent upon the skill of the person making the closure.

A principal object of the present invention is to provide a sutureless closure appliance that includes a slide fastener means operable to approximate the wound edges in near perfect position for substantially scar free healing, merely by movement of a slider. Such appliance is a marked improvement over the appliances disclosed by the following U.S. Pats.: Reichardt 345,541; De Baun 1,074,413; Radcliffe 1,428,495; De Muth 2,012,755; Fink 2,752,921 and Donaldson 2,873,741.

SUMMARY OF THE INVENTION

Broadly, a surgical appliance according to the present invention comprises a pair of adhesive backed fabric panels, each having an outwardly or forwardly turned inner edge portions; and slide fastener means mounted on the inner edge portions of the panels, entirely forwardly of the panels proper. The slide fastener means, when closed, holds the said inner edge portions of the fabric panels together in substantially abutting contact, so that a seam-like fold is formed on the back side of the appliance between and by the two fabric panels. The adhesive backing on each panel extends to the seam and substantially meets the adhesive backing on the other panel at the seam. In preferred form the slide fastener means includes a slider having, in place of a pull tab, a means defining a slot sized to receive the blade of a scalpel.

The surgical technique of the present invention comprises the basic steps of tacking the appliance to the operative site, with the slide fastener means thereof at least partially closed, and with the seam thereof placed where it is desired to make the incision; inserting the blade of a scalpel in the slot of said slider, with the cutting edge thereof facing the slider; moving the scalpel so as to simultaneously make the incision and move the slider to cause opening of the slide fastener means; making internal repair through the incision; and, following internal repair, and following suturing of the subcutaneous tissue if such is necessary, closing the epidermis by moving the slider in the direction opposite the direction it was moved by the scalpel.

The scalpel receiving slot in the slider lies in a common plane (substantially normal to the skin) with the seam formed by and between the inner edge portions of the fabric panels. Owing to this arrangement, and to the arrangement of the panels themselves and the slide fasteners thereon, and to the arrangement of the adhesive on the back of the panels, the scalpel blade passes through a very thin, almost non-existent, gap formed between the inner edges of the adhesive layers at the seam. The inner edge lines of the adhesive layers are substantially flush with the wound edge on its side of the incision. Accordingly, when the slider is appropriately moved to cause closing of the slide fastener means, the skin bordering the incision is brought back to substantially the exact position which it occupied before the incision was made. In some slide fasteners a capsular adhesive may be employed to adhere together the parts of the inner portions of the fabric which are located between the fastener elements and the surface of the skin. This is done to remove slack from such fabric so that the incision is not free to reopen.

The surgical appliance of the present invention may also be employed as a sutureless closure for traumatic wounds. An object of the present invention is the provision of a technique of using such appliance for closing traumatic wounds. Broadly, this technique comprises the steps of opening the surgical appliance a substantial amount by movement of the slider in the appropriate direction; commencing, in the vicinity of the slider, to tack down the two fabric panels on opposite sides of the wound, using care to see that the inner margin of the adhesive backing on each panel is located substantially even with the severed edge of the epidermis on its side of the wound; and, when the appliance is completely tacked down about the wound, moving the slider in the appropriate direction to close the slide fastener means, and in that manner pull the severed edges of the epidermis together.

Further objects, features and advantages of the present invention include the provision of a wound approximating and sutureless closure appliance wherein:

(a) The fabric panels comprise fabric and adhesive materials which are physiologically inert, provide ventilation of the skin through small pores, and are at least semitransparent, and the adhesive material provides strong resistance to traction in a lateral direction, but is easily removable if lifted off the skin;

(b) Wherein the slide fastener means includes two identical sliders, each operable to open the slide fastener means when moved toward the other, and to close the slide fastener means when moved away from the other;

(c) Each slider includes, in addition to a scalpel receiving slot, a means against which a tool may be urged for the purpose of moving the slider to close the slide fastener means;

(d) The slide fastener means comprises a chain of fastener elements secured to and along the forwardly turned inner edge portion of each panel, and a slider stop element at each end of each chain of fastener elements which is separate from, i.e. not connected with, its counterpart associated with the opposite chain; and (e) The appliance further includes a pair of elongated guards, each of which is insertable over, and clippable about one of the chains of fastener elements, such guards being fabricated from a soft surfaced elastomeric material.

Sutureless skin closures made by an appliance constructed according to the present invention possesses the following clinical and cosmetic qualities, as compared with sutured closures:

(1) Suture abscess, skin necrosis due to tension, crosspatch scarring by the suture, and suture discomfort are not experienced, and the likelihood of deep wound sepsis occurring is lessened, because no foreign body is introduced into the tissues which border the wound;

(2) Approximation of the wound edges is quickly and accurately done, simply by movement of a slider; and (3) The epidermis is returned to substantially the exact position it occupied before being severed.

These and other objects, features, advantages and characteristics of my surgical appliances, and additional techniques of using same, will be apparent from the following detailed description of a typical form of such appliances, and of the aforementioned techniques of using an appliance constructed according to the present invention. Reference is made in such description to the accompanying drawing, wherein like reference characters refer to like parts.

BRIEF DESCRIPTION OF THE DRAWING

FIG. 5 is a fragmentary perspective view of a portion of a human body being readied for surgery, including a showing of a vegetable dye pencil, or the like, being used for drawing a line substantially along which the incision will be made;

FIG. 6 is a fragmentary perspective view taken from the same aspect as FIG. 5, and showing the surgical appliance being set in place, with the sliders thereof moved inwardly until the coupled portion of the slide fastener is about equal in length to the surgeon's guide line, and with the seam of such appliance being positioned substantially directly over said line;

FIG. 7 is a view similar to FIG. 6, but showing the appliance in place, and showing the scalpel blade inserted into a slot formed in the outboard end portion of a divider at the branched end of the slider, and showing the scalpel in the process of being drawn toward the surgeon for making the incision and at the same time pushing the slider in the proper direction to cause decoupling of the fastener elements;

FIG. 8 is a perspective view on an enlarged scale, taken from above and towards the branched end and one side of the slider, such view presenting a clear showing of the scalpel in its position of use within said slot, and showing the disposition of the fastener elements after they are decoupled;

FIG. 9 is a fragmentary perspective view of the operative site after the incision has been completed, taken from the same aspect as FIGS. 5-7, such view showing a guard installed onto one chain of fastener elements, and another guard in the process of being installed onto the other chain of fastener elements;

FIG. 10 is a transverse sectional view taken substantially along line 10—10 of FIG. 9, showing the manner in which the guards cover or enclose the fastener elements, and also showing, together with FIG. 8, that the fastener elements are spaced well forwardly of the flesh that has been exposed by the incision;

FIG. 11 is a fragmentary perspective view of an end portion of the appliance after the slider therefor has been moved to effect coupling of most of the fastener elements, so as to substantially close the incision, and showing a small drainage tube installed in the end portion of the incision, between the slider and the uncut flesh outwardly of the incision;

FIG. 12 is a fragmentary perspective view showing a portion of a modified form of appliance, embodying plain ended fastener elements, and including an elongated area of capsular adhesive in the region between the inner edge of the tacky adhesive and the roll of fastener elements;

FIG. 13 is a view similar to FIG. 4, but of said modified form of appliance, and showing the capsular adhesive in a dry state, as small beads or capsules;

FIG. 14 is a view similar to FIG. 3, but of said modified form of appliance such view showing the ability of an incision to remain partially open due to slack inherently in the inner edge portion of the fabric in an appliance which includes a slide fastener composed of fastener elements having plain ends;

FIG. 15 is a view similar to FIG. 14, but showing a pliers-like tool in the process of pressing the slack portions of the fabric inwardly together to burst the adhesive capsules, and showing how removal of the slack from the fabric results in a closing of the incision; and FIG. 16 is a perspective view of the entire capsule bursting tool in a position of use.

DESCRIPTION OF THE PREFERRED EMBODIMENTS

Figure 1:
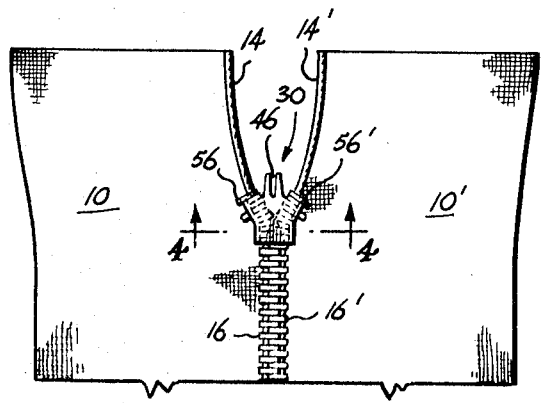
FIG. 1 is a front plan view of a surgical appliance typifying the article aspect of the present invention, such view showing the slide fastener portion of the appliance closed, and showing the appliance broken away in the middle for the purpose of indicating an indeterminant length.

Referring more specifically to the several figures of the drawing, and to FIGS. 1-4 and 4a in particular, the surgical appliance typifying the present invention is shown to comprise a pair of adhesive backed fabric panels 10, 10' each having a forwardly turned inner edge portion 12, 12'. The term "fabric" is used herein in the broad sense. Thus, it includes materials that might be classified as a cloth, a plastic, or a paper, for example. For reasons that will subsequently be explained, the panels 10, 10' (the fabric and adhesive combined) are made from materials which give such panels 10, 10' the qualities of being porous, semitransparent, non-irritating, easily removable if lifted off the skin, and of providing strong resistance to traction in a lateral direction. It remains adherent in the presence of fluids, and it permits permeation of the fluids. Also, it is free of a gummy residue and can be manipulated with rubber gloves. Nylon organdy and rayon organdy are typical and therefore non-limitive examples of fabrics which may be used in making the panels 10, 10'. Typical adhesives that may be used include an adhesive manufactured by the 3M Company of St. Paul, Minn., and used on a tape which is marketed under the name "Steri-Strips," or the name "Microwave Surgical Tape."

It has been found that a non-woven web or panel (with a thickness of approximately 125 microns) of viscose rayon fibers laid down in a random pattern, and coated by an adhesive that is a pure synthetic acrylic copolymer of extremely high molecular weight will (1) exhibit a virtual physiological inertness; (2) permits complete ventilation of the skin through microscopic pores permeable to both air and water; and (3) provide secure bonding with easy release from the skin. In actual tests involving several patients, tapes comprising these materials were applied to the skin and left there for more than a week. Allergic reaction did not occur, and no skin rashes were observed. For a further treatment of these findings, reference is made to the Summary of Proceedings of the Seminar on Clinical Results With Sutureless Skin Closure, presented Oct. 16, 1962, during the 48th Clinical Congress of the American College of Surgeons. Reference is also made to the article by J. Engleburt Dunehy, M.D. and David S. Jackson, Ph. D. entitled Practical Application of Experimental Studies in the Care of the Primarily Closed Wound, and appearing on pages 273-282 of the August 1962 issue of The American Journal of Surgery. To the extent necessary to a clearer understanding of the present invention, both of these articles are hereby expressly incorporated herein by reference.

Figure 3:
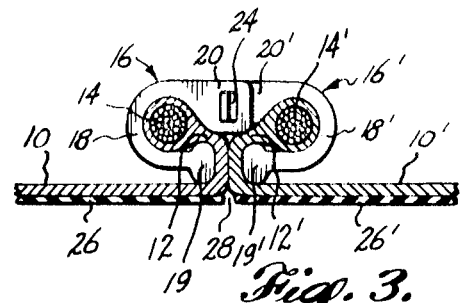
FIG. 3 is a transverse sectional view taken through the coupled chains of fastener elements which in part make up the slide fastener, with the section being taken substantially along line 3—3 of FIG. 1, such view clearly showing the substantially abutting contact made between the forwardly turned portions of the two panels, and showing that the fastener elements are located entirely forwardly of the fabric panel, and further showing, together with FIG. 2, the nearness of the inner edge of the adhesive backing on each panel to the inner edge of the adhesive backing on the other panel.
Figure 4A:
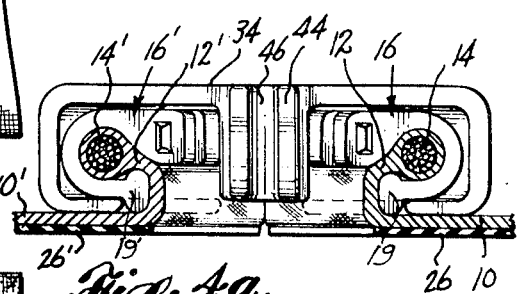
FIG. 4a is a transverse sectional view taken across a central portion of the appliance, substantially along line 4a—4a of FIG. 1 and also clearly showing that all parts of the slider are disposed completely forwardly of the general plane of the fabric panels.
Figure 4:
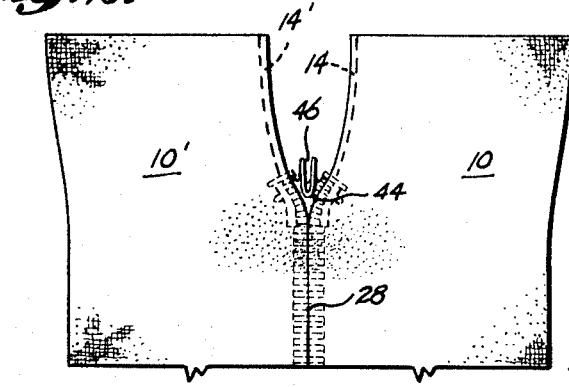
FIG. 4 is a transverse sectional view taken through the stem portion of the upper slider, substantially along line 4—4 of FIG. 1, such view clearly showing the slider to be disposed completely forwardly of the fabric panels, and showing in elevation a pair of coupled fastener elements in said stem portion, and further showing a pair of horns projecting outwardly on opposite sides of the branched portion of the slider, said horns serving as a means to be grasped by a pliers-like tool (not shown) used for moving the slider in the proper direction to cause coupling of the fastener elements.
Figure 4:
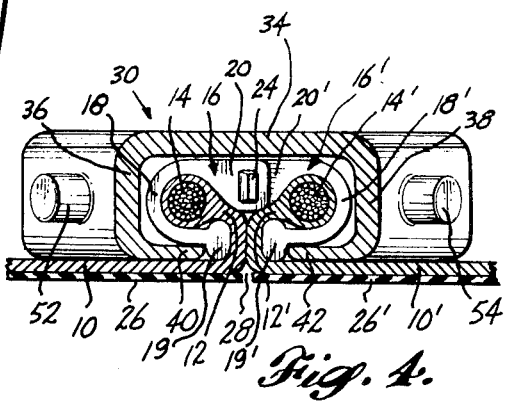

As perhaps best shown by FIGS. 3 and 4, a welt or edge bead 14, 14' is incorporated into each of the inner edge portions 12, 12'. A chain, row or series of fastener elements 16, 16' are crimped about the welts 14, 14' and the adjoining part of the edge portion 12, 12', or are otherwise secured to said edge portions 12, 12'. The fastener elements 16, 16' are illustrated as each having a hook portion 18, 18', which substantially surrounds and clamps onto the welt 14, 14' to which it is secured, and a coupling head portion 20, 20'. A projection 22, 22' is formed on one side of the coupling head portion 20, 20' of each element 16, 16' (see FIG. 8), and a complementary shaped recess 24, 24' (see FIGS. 3 and 4) is formed on the opposite side of each said coupling head portion 20, 20'. The fastener elements 16, 16' are substantially uniform in width, and the spaces between such elements 16, 16' are substantially equal in width to the elements 16, 16'. The fastener elements 16, 16' are of the same general type as shown by Takamatsu U.S. Pat. No. 3,121,928. They include horns 19, 19' at their inner ends which shape the fabric and provide the necessary clearance for the lips 40, 42 of the slider without developing slack in the fabric portions 12, 12'. In this regard compare FIGS. 3 and 4.

As clearly shown by FIG. 3, when the projections 22, 22' are mated within the recesses 24, 24', i.e. the fastener elements 16, 16' are coupled together, the inner edge portions 12, 12' of the panel 10, 10' are held in abutting contact at the bight or fold regions thereof by the horns 19, 19'. The major portions of the panels 10, 10', onto which the layers 26, 26' of adhesive are applied, are related in substantially coplanar parallelism if the appliance is applied to a relatively flat portion of the human body. Of course, if the portion of the body to which the appliance is secured is abruptly curved, the said major portions of the panels 10, 10' would substantially assume the same curvature. However, regardless of the shape or curvature assumed by the adhesive backed portions of the panels 10, 10' it is to be noted that the fastener elements 16, 16' are disposed wholly forwardly of such adhesive backed portions. That is to say, there is a layer of fabric between each part of the elements 16, 16' and the skin; no part of such elements 16, 16' is located on or projects inwardly beyond, the rear surfaces of the panels proper. Thus, when the fastener elements 16, 16' are coupled a seam 28 is formed between and by the fabric panels 10, 10' on the rear side of the appliance. The adhesive material 26 on the back side of panel 10 extends to the seam and substantially meets the adhesive backing 26' on the back side of panel 10' at the seam. There is only about a knife's width of separation between the inner edges of the adhesive layers 26, 26' at the seam 28.

Figure 2:
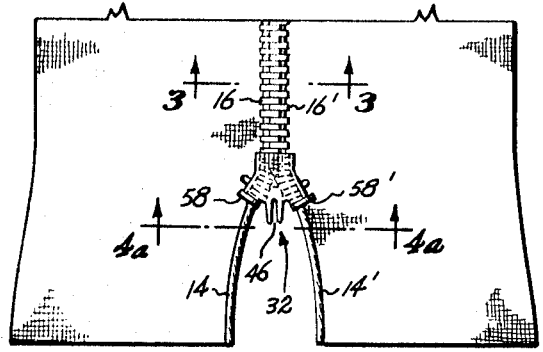
FIG. 2 is a rear plan view of such appliance, showing the seam that is formed where the forwardly turned portions of the two panels abut together, and showing the inner edge of the tacky adhesive backing on each panel bordering said seam contiguous the inner edge of the tacky adhesive backing of the other panel.

As shown by FIGS. 1 and 2, for example, the slide fastener of the surgical appliance is provided with a pair of sliders 30, 32 which are substantially identical in construction. Each slider 30, 32 is arranged to couple the fastener elements 16, 16' when moved away from the other, and to decouple such elements 16, 16' when moved toward the other. Each slider 30, 32 includes what may be termed a stem end portion and a branched end portion.

The stem end portion is illustrated in section in FIG. 4. It is in the form of a lipped channel, and the fastener elements 16, 16' move relatively through it coupled together. As clearly shown by FIG. 4, the front wall 34 of the slider 30 (slider 30 being chosen by way of example for this discussion of the features common to both the sliders) forms the web of such channel. The side walls 36, 38, which are parallel in their extent through the stem portion of slider 30, form the flanges of said channel. The back of the slider, which is not followed or does not extend completely across the slider 30, but rather is open at its middle to provide an avenue through which the forwardly turned portions 12, 12' of the fabric may extend, is formed by a pair of lips 40, 42 which turn inwardly from the flanges 36, 38 and extend toward each other in coplanar parallelism.

The side walls 36, 38 and the lips 40, 42 diverge apart as they extend away from the stem portion of the slider 30 and through the branched portion thereof (FIGS. 1, 2, 4 and 8, for example). The angle of divergence is slightly larger in slider 32 than in slider 30 due to the reverse positioning of the projections 22, 22' and recesses 24, 24'. A separator 44, (FIG. 2) divides the interior of the slider 30 into two separate branch channels, each of which is wide enough to accommodate only one row of fastener elements, 16, 16'. Such branch channels diverge apart as they extend away from the larger channel in the stem portion of the slider 30. As will be understood by those skilled in the slide fastener art, when the slider 30 is moved branched end first, the fastener elements 16, 16'; which enter into it uncoupled through the branch channels are interleaved together inside the slider 30 and pass relatively through the stem portion thereof coupled together. When the slider 30 is moved with its stem portion leading, the elements 16, 16' are separated inside the slider 30, and they pass relatively rearwardly out through the branch channels uncoupled (see FIG. 8).

For purposes of performing a technique of the present invention, hereinafter to be described, and perhaps other techniques as well, a scalpel receiving slot 46 is formed in an outboard portion 44 of the separator 48. This slot 46, and the scalpel 50 received therein, together serve in effect as a pull tab for use in moving the slider 30 in the proper direction to cause decoupling of the fastener elements 16, 16' (as indicated by the directional arrow in FIG. 8). All portions of the slider 30, including the separator 48, are spaced well forwardly of the adhesive 26, 26' (see FIGS. 4 and 4a).

A pair of horns 52, 54 are provided on opposite sides of the slider 30, in the branched portion thereof. When the slider 30 is to be pulled in the proper direction to cause coupling of the elements 16, 16' a pliers-like tool (not shown) having sockets or recesses for the horns 52, 54 formed in the jaws thereof, is used for grasping the slider 30, by engaging the horns 52, 54 in said sockets, and then the tool is pulled in the direction of advance.

A stop element or abutment 56, 56', 58, 58' is secured to the welt 14, 14' at each end of each chain of fastener elements 16, 16'. As shown by FIGS. 1 and 2, for example, a fastener-element-free or tail portion of the welt 14, 14' may extend outwardly from the stops 56, 56', 58, 58' to the respective ends of the appliance.

When the slide fastener is closed and the fabric panels 10, 10' are in coplanar parallelism (FIG. 3, for example), the seam 28 and the line of couple of the projections 22, 22', and the complementary shaped cavities 24, 24', which line is offset forwardly of the seam 28, are both substantially located in a plane that is substantially perpendicularly related to the plane of the panels 10, 10'.

A surgical technique in which the surgical appliance of the present invention is employed will now be described, with reference being made to FIGS. 5–11 in particular.

FIG. 5 is a view of the operative site OS after it has been prepared for surgery, such as by a soap and water washing followed by an alcohol rinse, and by drying with a sterile towel, for example. The hand of the surgeon is shown in the process of drawing an incision guide line L with a vegetable dye pencil P, or the like.

Next, the surgical appliance is prepared for application to the operative site. Firstly, the appliance is removed from a protective envelope (not shown) in which it is stored in a sterile condition. Then, a sterile protective backing (not shown, but preferably comprising one or more pieces of gauze, plastic surfaced paper, etc., sized to completely cover the adhesive layers 26, 26' on the panels 10, 10') is removed at least an amount sufficient to permit the sliders 30, 32 to each be moved inwardly until the closed portion of the slide fastener is approximately equal in length to the guide line L. The appliance is then set in place. This entails aligning the slot 46 in slider 30 with the upper end portion of the line L, and then tacking the appliance in place, with the seam 28 thereof positioned substantially directly over the line L, by smoothing the tapes 10, 10' down, working from slider 30 to slider 32. After the central portion of the appliance is tacked down, the sliders 30, 32 are moved outwardly to and against the stops 56, 56' and 58, 58', respectively. The end portions of the appliance are then tacked down by smoothing down the end portions of the panels 10, 10'.

As the next step of the preferred technique, the upper slider 30 is moved (by use of the aforementioned pliers-like tool) back down to a position wherein the slot 46 is aligned with the upper end portion of the line L. This causes decoupling of the fastener elements 16, 16' in region 60 (FIG. 7) of the slide fastener, but such elements will remain contiguously related due to the fact that the panels 10, 10' are tacked down.

A slight gap exists between the chains of fastener elements 16, 16' in the vicinity of, and immediately rearwardly (in relation to the movement of slider 30) of, the slot 46. The surgeon places the blade of his scalpel 50 partially in such gap and partially in the slot 46, which slot is properly sized to receive the same. As illustrated, the cutting edge of the scalpel blade faces toward the slider 30. The surgeon then draws the scalpel 50 toward him to make the incision. As the scalpel 50 moves it in turn moves with it, toward the other slider 32, so as to cause decoupling of the fastener elements 16, 16' immediately forwardly of the scalpel blade.

When the end of the guide line L is reached (in FIG. 7 the slider 30 is shown in reference at the lower end of line L), and the incision is completed, the scalpel 50 is removed, and the slide fastener is opened an additional three or four inches, so that it will not impair stretching or separation of the incision during the operation. This amounts to using the aforementioned pliers-like tool to move the slider 30 downwardly to a position against the slider 32. The slide fastener was opened in region 60 for this same reason. It is generally necessary to apply mechanical retractors on opposite sides of the incision and use them for spreading open the incision. The skin outwardly of the incision, at the opposite ends there, cannot be bound, but rather must be free to stretch during retraction.

Before retraction the fastener elements 16, 16' which border the incision are covered for the purpose of guarding against injury to organs or other internal parts of the body, which may be placed on or near such fastener elements 16, 16' during the operation, and to prevent sutures from catching on the elements 16, 16' during sewing of the subcutaneous layers of tissue. Preferably, the means for covering each chain of fastener elements 16, 16' comprises a tubular guard G, G' formed to include a longitudinal slit. The guards G, G' are made from an elastomeric or rubber-like material, such as vinyl plastic, polypropylene plastic, rubber, nylon, etc., for example. The tubing material is sufficiently stiff that it normally holds the generally circular cross-sectional shape in which it is formed. When squeezed, the tubing will collapse, but it is sufficiently resilient to substantially return to its original shape when the collapsing pressure is released. As perhaps best shown by FIG. 10, the tubular guards G, G' are spread apart at the slit so as to create a side opening of sufficient size to permit insertion of such guards 6, 6' over the fastener elements 16, 16'. When the hands are removed, the guards G, G' tend to assume their original tubular form. As a result, such guards G, G' clamp tightly and firmly against and around the chains of fastener elements 16, 16' and remain so positioned until removed when their presence is no longer required.

After the internal repair of the body and the suturing of the subcutaneous layers of tissue have ben completed, and the surgeon is ready to close the incision in the epidermis, the guards G, G' are removed, and the slider 30 is moved upwardly. Of course, the various bathing and sponging steps which normally accompany closure of an incision are performed in proper sequence with the steps involved in the operative technique of the present invention.

Subcutaneous closure can often be dispensed with however, since the panels 10, 10' are relatively wide and are tacked to the skin a considerable distance away from the incision, the appliance, when closed, brings the skin and subcutaneous tissue together as a unit.

Referring now to FIGS. 3 and 10, the slot 46 lies in the same plane with the line of coupling and decoupling of the fastener elements 16, 16', and the seam 28. Owing to this arrangement, the scalpel blade passes through the very thin, almost non-existent, gap formed between the inner edges of the adhesive layers 26, 26' at the seam 28. As clearly shown by FIG. 10, the inner edge line 62 of the adhesive layer 26 is substantially flush with the flesh wall 64 on its side of the incision, and the inner edge line 66 of the adhesive layer 26' is substantially flush with the flesh wall 68 on the opposite side of the incision. Since the panels 10, 10' remain tacked in their original positions on the patient's skin by the adhesive 26, 26', the fastener elements 16, 16' always retain their original positions relative to the skin that borders the incision. This is true even though such skin is stretched somewhat during the operation. The fabric stretches with the skin so that there is substantially no lifting of the adhesive 26, 26' off from the skin. When the slider 30 is appropriately moved to cause coupling of the fastener elements 16, 16', the skin bordering the incision is brought back to substantially the exact position which it occupied before the incision was made. The severed edges of skin are drawn laterally inwardly toward each other, and are held together, in abutting contact, and in correct longitudinal alignment, by the coupled fastener elements.

Quite frequently it is necessary to insert one or more drainage tubes in the incision. The conventional practice, when a sutured closure is employed, is to locate the drainage tube at the end of the incision and then sew up to it. According to the present invention, the drainage tube DT is placed in the incision at the same location, and the slider 30 is moved substantially as far as it will go towards the drainage tube DT. As clearly shown by FIG. 11, owing to the fact that the chains of fastener elements 16, 16' emerge from the branched end of the slider 30 along divergent paths, and further due to the fact that the end portion of the slide fastener, situated outwardly of the end of the incision, is tacked down, the two chains of fastener elements 16, 16' form a generally oval or lenticular shape gap between then in the region of the end portion of the incision. It is through this gap that the drainage tube DT is inserted. In some operations it may be necessary to place a second drainage tube DT at the opposite end of the incision. If so, the slider 32 is merely moved inwardly until the end portion of the incision at its end of the appliance is exposed. The second drainage tube DT is then inserted in the same manner as the first. The sliders 30, 32 may be restrained against movement merely by placing a piece of tape over it. The drainage tube or (tubes) DT is removed when it is no longer needed. The sliders 30, 32 are then moved outwardly to the end of their respective runs, against the stop 56, 56' and 58, 58'.

Throughout the healing process the skin pores below the panels 10, 10' are ventilated either directly through the tape or by an interfacial capillary that has access to an open pore. The healing process may be visually noted, as the skin areas bordering the incision are visible through the panels 10, 10'.

As in the case of suture closures, and tape closures after them, the surgical appliance of the present invention is used to fix the skin edges firmly and keep them tightly together during motion of the skin on opposite sides of the incision. When the union of cells on opposite sides of the incision is accomplished to such an extent that the skin movement will not break the bond of such cells and reopen the incision, the surgical appliance is no longer needed and may be removed. This is done by the attendant simply grasping the appliance at one corner thereof and peeling it off from the skin. As previously mentioned, the adhesive used provides secure bonding and strong resistance to traction in a lateral direction, but is easily removed if lifted off the skin.

The surgical appliance of the present invention may also be employed as a sutureless closure for traumatic wounds. Thus, cuts suffered accidentally by sharp instruments or objects may be closed without anesthesia when such appliance is employed. The wound itself and the region surrounding it are first thoroughly cleaned and prepared for closure, using conventional techniques in this regard. The slide fastener of the surgical appliance is opened about three-quarters of the way, for example and then, starting at the slider, the opposite panels 10, 10' are tacked down on opposite sides of the wound. This may be done by the physician using his fingers to smooth down the panels 10, 10', while at the same time using care to see that the inner edge lines 62, 64 of the adhesive layers are located substantially even with the respective edges of the cut. When the appliance is completely tacked down, the slider is appropriately moved to cause coupling of the fastener elements 16, 16'. This in turn causes the severed edges of the epidermis or skin to be pulled together. As will be apparent, the slider for an appliance made specially for this technique does not need a scalpel slot.

FIGS. 12–16 relate to a modified form of the appliance which comprises a different form of fastener element from the above described appliance. The fastener elements 100, 100' are of the type disclosed in McNamara 2,997,766. Rather than having horns at their inner ends they have what may be termed "plain" inner ends 102, 102'. As a result slack develops in the inner edge portions 12, 12' which results in the incision 104 remaining partially open after passage of the slider 30, a condition has been exaggerated somewhat in FIG. 14. The two fabric panels 10, 10' of the slide fastener each include a layer 26, 26' of a "tacky" adhesive.

After the appliance has been applied to the skin with the slide fastener closed, and the incision 104 has been made and the slide fastener reclosed, as explained above in connection with the preferred technique of the invention, the skin areas on the opposite side of the incision 104 are returned to their original longitudinal positions. However, owing to the slack a wider than desired gap exists laterally between the two cut edges of the incision 104. According to the invention the forwardly turned portions 12, 12' of the fabric are each provided with a narrow area of a capsular adhesive in the region thereof between the row of fastener elements 100, 100' and the inner edges of the tacky adhesive 26, 26'. As thoroughly explained in the article "Capsular Adhesives" (by Hans F. Huber and Howard G. Stroble, and appearing in the May 1966 issue of The Journal of the Technical Association of the Pulp and Paper Industry, vol. 49, No. 5), a capsular adhesive is an adhesive which comprises small droplets or particles of a liquid or solid type adhesive surrounded by a continuous film of a polymeric material, or the like. The contents of this article is hereby expressly incorporated herein by this expressed reference.

Capsular adhesives are nontacky or dry until the encapsulated material is released upon the application of pressure. Accordingly, during the incision making step the capsular adhesive films 106, 106' are dry and will not stick to the scalpel in the event some contact occurs between the two. According to the invention, following the making of the incision and a reclosing of the slide fastener, the cooperating wheel portions 108, 110 of a pliers-like tool 112 is installed on the slide fastener in the manner illustrated by FIGS. 15 and 16, and is then drawn lengthwise of the slide fastener (in the direction of the arrows in FIG. 16) while at the same time an inward squeezing force is applied on the handles 114, 116 so that the wheels 108, 110 are forced inwardly to apply a nipping pressure on, and squeeze together, the slack portions 112, 112' of the fabric and burst the adhesive capsules. This causes a cementing together of such portions 112, 112' in the regions where pressure is applied, so that the portions 118, 120 (FIG. 15) of the fabric are held in coplanar parallelism and are in effect one continuous region of fabric spanning across the region between the inner edges of the tacky adhesive 26, 26'. Such portions 118, 120 are in tension and serve to hold the two cut edges of the incision 104 laterally together. As explained above, the slide fastener itself has properly oriented the cut edges in the longitudinal direction.

The wheels 108, 110 are mounted to be freely rotatable, either on the lower end portions of the shafts 122, 124 (assuming such shafts to be fixed) or with such shafts 122, 124 (assuming such shafts to be rotatably mounted in the forward end portions 126, 128 of the tool 112 and to be fixed at their lower ends to the wheels 108, 110).

The peripheral edges 130, 132 of the wheels 108, 110 may be circumferentially grooved, seriated, or otherwise patterned for the purpose of making them better able to grip onto and roll along the fabric.

In each form of the invention the appliance is "fluid permeable." The fabric is air breathing and will admit the passage of a liquid and so will the slide fastener.

From the foregoing, various further features, advantages, objectives, modifications, adaptations and rearrangements of the surgical appliance of the present invention, and additional techniques involving the use of such appliance, will be apparent to those skilled in the art within the scope of the following claims.

What is claimed is:

1. A surgical appliance comprising a pair of fluid permeable, tacky adhesive backed fabric panels, each having a forwardly turned inner edge portion having a free edge; and slide fastener means mounted on the inner edge portions of the panels at said free edges and entirely forwardly of the panels proper, and when closed forming sharp angled folds in said panels, and holding such folds together in near abutting contact, so that a seam is formed on the back side of the appliance between and by the two folds, and with the tacky adhesive backing on each panel extending inwardly towards the seam to about where said inner edge portion starts to turn forwardly, said slide fastener means including a slider spaced entirely forwardly of said tacky adhesive backing, so that during normal movement thereof the slider is spaced forwardly of and makes no contact with the skin.

2. A surgical appliance according to claim 1, wherein the slide fastener means includes two of such sliders, each of which is operable to open the slide fastener means when moved toward the other, and to close the slide fastener means when moved away from the other.

3. A surgical appliance according to claim 1, wherein the tacky adhesive backing on each panel has an inner edge which is closely adjacent the inner edge of the tacky adhesive backing on the other panel.

4. A surgical appliance according to claim 1, wherein the fabric panels are made of a translucent, air-breathing organdy material.

5. A surgical appliance according to claim 1, wherein the tacky adhesive backing on each panel has an inner edge which is spaced laterally from the inner edge of the tacky adhesive backing on the other panel, and wherein a film of capsular adhesive extends along the inner side of each said forwardly turned inner edge portion, between the inner edge of the tacky adhesive and the slide fastener means.

6. A surgical appliance comprising a pair of fluid permeable, tacky adhesive backed fabric panels, each having a forwardly turned inner edge portion; and slide fastener means including fastener parts mounted on the inner edge portion of each panel, entirely forwardly of the panel proper, and at least one slider adapted to be moved along the fastener parts for coupling and decoupling the same, said slider comprising a front wall which overlies both fastener parts, a pair of side walls extending from the side edges of the front wall towards the fabric panels, one outwardly adjacent each fastener parts, a lip extending from the rear edge of each side wall inwardly toward the forwardly turned edge portion of the adjacent panel, substantially in coplanar parallelism with the other lip, with the front wall, the side walls and the lips together forming a generally straight channel at one end of the slider through which the fastener parts pass coupled together, with said side walls and said lips diverging apart as they extend from such generally straight channel to the opposite end of the slider, and with the front wall widening out in its extent in the same direction, and said slider further including a partition extending from the front wall towards the fabric and dividing the interior of the slider into two separate branch channels at said opposite end, through which channels the two fastener parts pass separately, with the slider pulling the inner edge portions of the panels together into substantially abutting contact at the same time it couples the fastener parts, with said fastener parts, when coupled, holding the said inner edge portions together in substantially abutting contact, so that a seam is formed on the back side of the appliance between and by the two fabric panels, and with said partition being spaced forwardly of said tacky adhesive backing so that during normal movement of the slider the partition makes no contact with the skin.

7. A surgical appliance according to claim 6, wherein each fastener part is a chain of fastener elements, and wherein said appliance further includes a pair of elongated guards, each of which is clipped about one of the chains of fastener elements where it borders the incision, such guards being fabricated from a soft surfaced elastomeric material.

8. A surgical appliance according to claim 6, wherein the fabric panels are composed of a translucent organdy material and the tacky adhesive is a synthetic acrylic copolymer of extremely high molecular weight, both of which are physiologically inert, provide ventilation of the skin through small pores, and the adhesive material provides strong resistance to traction in a lateral direction, but is easily removable if lifted off the skin.

9. A surgical appliance according to claim 6, wherein the fabric material is a non-woven web of viscose rayon fibers laid down in a random pattern, and the adhesive is a synthetic acrylic copolymer of extremely high molecular weight, both of which are physiologically inert and provide ventilation of the skin.

10. A surgical appliance according to claim 6, wherein the tacky adhesive backing on each panel has an inner edge which is spaced laterally from the inner edge of the tacky adhesive backing on the other panel, and wherein a film of capsular adhesive extends along the inner side of each said forwardly turned inner edge portion, between the inner edge of the tacky adhesive and the slide fastener means.

11. A surgical appliance according to claim 6, wherein a stop member is secured to each forwardly turned inner edge portion of each panel at each end of each elongated slide fastener parts.

12. A surgical appliance according to claim 6, wherein the slide fastener means further includes a second slider that is substantially identical in construction to the first slider, with each of said sliders being operable to decouple the fastener parts when moved toward the other, and to couple the slide fastener parts when moved away from the other.

13. A surgical appliance comprising a pair of fluid permeable adhesive backed fabric panels, each having a narrow forwardly turned inner edge portion; and slide fastener means including fastener parts mounted on said inner edge portions, entirely forwardly of the panels proper, and a slider mounted on said fastener parts and movable therealong, lengthwise of the appliance for coupling and decoupling said parts, with said fastener parts including stiff inner edge portions which when the slide fastener means is closed form sharp angled folds in said panels and hold such folds together in near abutting contact, so that a substantially narrow seam is formed on the backside of the appliance by and between the two folds, with the adhesive backing on each panel extending to the seam and substantially meeting the adhesive backing on the other panel at the seam, and with all parts of the slider being forwardly of the adhesive backing.

14. A surgical appliance according to claim 13, wherein said slide fastener means is shorter than said panels and at each of its ends terminates at a location spaced inwardly from the ends of the two panels.

15. A surgical appliance according to claim 13, wherein the slide fastener means further includes a second slider that is substantially identical in construction to the first slider, with each of said sliders being operable to decouple the fastener parts when moved toward the other, and to couple the slide fastener parts when moved away from the other.

16. A surgical appliance comprising a pair of adhesive backed fabric panels; and slide fastener means interconnecting said panels when closed, said slide fastener means including a slider located entirely forwardly of the adhesive backing, and movable in one direction to open the slide fastener means and in the opposite direction to close said slide fastener means, with the adhesive backing on each panel extending rearwardly and substantially meeting the adhesive backing on the other panel when the slide fastener means is closed, and said slider including a centrally located scalpel receiving slot that opens rearwardly with respect to the direction that the slider travels, so that a scalpel may be placed in the slot and used to move the slider in a direction causing opening of the slide fastener means while at the same time it is making an incision.

17. A surgical appliance according to claim 16, wherein the slide fastener means further includes a second slider that is substantially identical in construction to the first slider, with each of said sliders being operable to decouple the fastener parts when moved toward the other, and to couple the slide fastener parts when moved away from the other.

18. A surgical appliance comprising a pair of adhesive backed fabric panels, each having a forwardly turned inner edge portion having a free edge; and slide fastener means mounted on the inner edge portions of the panels, at said free edges and entirely forwardly of the panels proper, and when closed forming rather sharply curved folds in said panels, and holding such folds together in near abutting contact, so that a seam is formed on the back side of the appliance between and by the two folds, and with the adhesive backing on each panel extending to the seam and substantially meeting the adhesive backing on the other panel at the seam, said slide fastener means including a slider spaced entirely forwardly of said adhesive backing, so that during normal movement thereof the slider makes no contact with the skin, said slider having in place of a pull tab a means defining a slot sized to receive the blade of a scalpel, so that the scalpel may be inserted into the slot and when moved to make an incision will move with it the slider to open the slide fastener means.

19. A surgical appliance according to claim 18, wherein said slider also includes means against which a tool may be urged for the purpose of moving the slider in the proper direction to close the slide fastener means.

20. A surgical appliance according to claim 19, wherein the slide fastener means includes a second slider of like character, with each of the sliders being operable to open the slide fastener means when moved toward the other, and to close the slide fastener means when moved away from the other.

21. A surgical appliance comprising a pair of adhesive backed fabric panels, each having a forwardly turned inner edge portion; and slide fastener means including an elongated fastener part mounted on the inner edge portion of each panel, entirely forwardly of the panel proper, and at least one slider adapted to be moved along the fastener parts for coupling and decoupling the same, said slider comprising a front wall which overlies both fastener parts, a pair of side walls extending from the side edges of the front wall towards the fabric panels, one outwardly adjacent each fastener part, a lip extending from the rear edge of each side wall inwardly toward the forwardly turned edge portion of the adjacent panel, substantially in coplanar parallelism with the other lip, with the front wall, the side walls and the lips together forming a generally straight channel at one end of the slider through which the fastener parts pass coupled together, with said side walls and said lips diverging apart as they extend from such generally straight channel to the opposite end of the slider, and with the front wall widening out in its extent in the same direction, and said slider further including a partition extending from the front wall towards the fabric and dividing the interior of the slider into two separate branch channels at said opposite end, through which channels the two fastener parts pass separately, with the slider pulling the inner edge portions of the panels together into substantially abutting contact at the same time it couples the fastener parts, with said fastener parts when coupled, holding the said inner edge portions substantially together in abutting contact, so that a seam is formed on the back side of the appliance between and by the two fabric panels, and with said partition being spaced forwardly of said adhesive backing so that during normal movement of the slider the partition makes no contact with the skin, and said partition being formed to include an outwardly opening center slot sized to receive the blade of a scalpel, so that a scalpel placed in the slot and moved to make an incision will move with it the slider to decouple the fastener parts.

22. A surgical appliance according to claim 21, wherein the slider also includes means on the side walls thereof to be engaged by a tool that is used for moving the slider to couple the fastener parts.

23. A surgical appliance comprising a pair of adhesive backed fabric panels, each having a narrow forwardly turned inner edge portion; and slide fastener means including fastener parts mounted on said inner edge portions, entirely forwardly of the panels proper, and a slider mounted on said fastener parts and movable therealong, lengthwise of the appliance for coupling and decoupling said parts, with said fastener parts including stiff inner edge portions which when the slide fastener means is closed form relatively sharply rounded folds in said panels and hold such folds together in near abutting contact, so that a narrow seam is formed on the backside of the appliance by and between the two folds, and with the adhesive backing on each panel extending to the seam and substantially meeting the adhesive backing on the other panel at the seam, and said slider having in place of a pull tab a means defining a slot sized to receive the blade of a scalpel, so that the scalpel may function to move the slider in a direction causing opening of the slide fastener means while at the same time it is making an incision.

24. A surgical technique involving the use of a surgical appliance composed of a pair of adhesive backed fabric panels, each having a forwardly turned inner edge portion, slide fastener means mounted on the inner edge portions of the panels, entirely forwardly of the panels proper, and when closed holding the said inner edge portions together in abutting contact, so that a seam is formed on the back side of the appliance between and by the said forwardly turned portions of the two fabric panels, with the adhesive backing on each panel extending to the seam and substantially meeting the adhesive backing on the other panel at the seam; with said slide fastener means including a slider movable in one direction to open the slide fastener means and in the opposite direction to close such slide fastener means, and with said slider having a center slot therein that opens rearwardly with respect to the direction that the slider travels for opening the slide fastener means, which slot is offset forwardly of, and is generally aligned with, said seam, said technique comprising: tacking the said appliance to the operative site, with the slide fastener means thereof at least partially closed, and with the seam thereof placed where it is desired to make the incision; inserting the blade of a scalpel in the slot of said slider, with the cutting edge thereof facing the slider; moving the scalpel so as to simultaneously make the incision and move the slider to cause opening of the slide fastener means; and, following internal repair, closing the epidermis by moving the slider in the direction opposite the direction it was moved by the scalpel.

25. A surgical technique involving the use of a surgical appliance composed of a pair of adhesive backed fabric panels, each having a forwardly turned inner edge portion, slide fastener means mounted on the inner edge portions of the panels, entirely forwardly of the panels proper, and when closed holding the said inner edge portions together in abutting contact, so that a seam is formed on the back side of the appliance between and by the forwardly turned portions of the two fabric panels, with said slide fastener means including a slider movable in one direction to open the slide fastener means and in the opposite direction to close such slide fastener means, and with said slider having a central slot therein that opens rearwardly with respect to the direction that the slider travels in order to open the slide fastener means, which slot is offset forwardly of, and is generally aligned with, said seam, said technique comprising: drawing a guide line for the incision at the operative site; tacking the said appliance to the operative site, with the slide fastener means thereof at least partially closed, and with the seam thereof aligned substantially directly over the said guide line; inserting the blade of a scalpel in the slot of the slider; with the cutting edge thereof facing the slider; moving the scalpel so as to simultaneously make the incision and move the slider to cause opening of the slide fastener means; and, following internal repair, closing the epidermis by moving the slider in the direction opposite the direction it was moved by the scalpel.

26. A surgical technique involving the use of a surgical appliance composed of a pair of adhesive backed fabric panels, each having a forwardly turned inner edge portion, slide fastener means mounted on the inner edge portions of the panels, entirely forwardly of the panels proper, and when closed holding the said inner edge portions in abutting contact, so that a seam is formed on the back side of the appliance between and by the said forwardly turned portions of the two fabric panels, with said slide fastener means including a pair of identical sliders, each of which is adapted to open the slide fastener means if moved toward the other, and to close the slide fastener means if moved away from the other, and each of which has a center slot therein that opens rearwardly with respect to the direction that it must travel in order to open the slide fastener means, which slot is offset forwardly of, and is generally aligned with, said seam, said technique comprising: moving both sliders inwardly somewhat so that the closed portion of the slide fastener means between the sliders is approximately equal in length to the incision that is to be made; tacking the said appliance to the operative site by placing the seam in the closed portion thereof where it is desired to make the incision and smoothing the portion of the fabric panels between the two sliders down against the skin, then moving the two sliders outwardly to terminal positions, and then smoothing down the end portions of said panels; returning one of the sliders to the starting point of the incision; inserting the blade of a scalpel in the slot of such slider, with the cutting edge thereof facing the slider; moving the scalpel so as to simultaneously make the incision and move the slider to cause opening of the slide fastener means; removing the scalpel blade from the slot when the end of the incision is reached; opening the slide fastener further by moving such slider to a position substantially against the other slider; performing internal repair through the incision; and, following such internal repair, closing the epidermis by moving the slider that was moved by the scalpel in the direction opposite the direction it was moved by the scalpel.

27. A surgical technique involving the use of a surgical appliance composed of a pair of adhesive backed fabric panels, each having a forwardly turned inner edge portion, slide fastener means including a chain of fastener elements mounted on the inner edge portion of each panel, entirely forwardly of the panel proper, and at least one slider adapted to be moved along said chains for coupling and decoupling the fastener elements, said slider having a slot formed therein that opens rearwardly with respect to the direction that the slider travels for decoupling the fastener elements, which slot is offset forwardly of, and is generally aligned with, said seam, with the fastener elements, when coupled, holding the said inner edge portions of the fabric panels together in abutting contact, so that a seam is formed on the back side of the appliance between and by the said forwardly turned portions of the two fabric panels, said technique comprising: tacking the said appliance to the operative site, with the slide fastener means thereof at least partially closed, and with the seam thereof placed where it is desired to make the incision; then inserting the blade of a scalpel in the slot of said slider, with the cutting edge thereof facing the slider; moving the scalpel so as to simultaneously make the incision and move the slider to cause decoupling of the fastener elements; covering the fastener elements which border the incision with a soft surfaced elastomeric material; perform an internal repair through the incision; and, following the internal repair, removing the covering means from the fastener elements; and closing the epidermis by moving the slider in the direction opposite the direction it was moved by the scalpel.

References Cited

UNITED STATES PATENTS

| | | | |
|---|---|---|---|
| 2,012,755 | 8/1935 | De Muth | 128—335 |
| 2,520,484 | 8/1950 | Wax | 206—41.5 |
| 2,752,921 | 7/1956 | Fink | 128—334 |
| 2,775,012 | 12/1956 | Mulka | 24—205.1 |
| 2,820,272 | 1/1958 | Humphreys | 24—205 |
| 2,873,741 | 2/1959 | Donaldson | 128—303 |
| 2,994,469 | 8/1961 | Troup et al. | 229—51 |
| 2,997,766 | 8/1961 | McNamara | 24—205.1 |
| 3,121,021 | 2/1964 | Copeland | 128—156 X |
| 3,121,928 | 2/1964 | Takamatsu | 24—205.1 |
| 3,324,522 | 6/1967 | Howell | 24—205.1 |

DALTON L. TRULUCK, Primary Examiner

U.S. Cl. X.R.

24—205